United States Patent [19]

Brown et al.

[11] Patent Number: 4,967,485

[45] Date of Patent: Nov. 6, 1990

[54] ELECTRONIC FEELER GAUGE

[75] Inventors: Steve K. Brown, Lynchburg; Larry D. Dixon, Forest, both of Va.

[73] Assignee: The Babcock & Wilcox Company, New Orleans, La.

[21] Appl. No.: 373,859

[22] Filed: Jun. 29, 1989

[51] Int. Cl.$^5$ .............................................. G01B 5/13
[52] U.S. Cl. ................................................... 33/787
[58] Field of Search ............... 33/DIG. 13, 783, 787, 33/788, 789, 544, 542, 555.1, 555.2; 73/760, 784

[56] References Cited

U.S. PATENT DOCUMENTS

| | | | |
|---|---|---|---|
| 3,744,303 | 7/1973 | Drzewiecki et al. | 73/760 |
| 4,294,015 | 10/1981 | Drouin et al. | 33/DIG. 13 |
| 4,464,419 | 8/1984 | Horn | 33/DIG. 13 |
| 4,542,655 | 9/1985 | Park et al. | 73/784 |
| 4,549,355 | 10/1985 | Sauer et al. | 33/783 |

FOREIGN PATENT DOCUMENTS

| | | | |
|---|---|---|---|
| 144297 | 1/1982 | U.S.S.R. | 33/544.1 |
| 956969 | 9/1982 | U.S.S.R. | 73/760 |

Primary Examiner—William A. Cuchlinski, Jr.
Assistant Examiner—D. Price
Attorney, Agent, or Firm—Robert J. Edwards; D. Neil LaHave

[57] ABSTRACT

An electronic feeler gauge for measuring the dimension of a gap. A flexible base in the general shape or a shoehorn has a raised shoulder portion of greater thickness substantially along its rear half with a forwardly extending tab that acts as a stop. A strain gauge mounted substantially in line with the tab at the lower portion of the concave curve of the flexible base only measures strain across the width thereof. Electrical signals from the strain gauge are conducted to a strain meter by electrical wires for analyzing the signals and converting them to readings indicating the size of the gap into which the flexible base in inserted.

9 Claims, 1 Drawing Sheet

ELECTRONIC FEELER GAUGE

BACKGROUND OF THE INVENTION

1. Field of the Invention

The invention is related to measuring equipment and more particularly to instruments for measuring gap size.

2. General Background

In the nuclear industry measurement of gaps in reactor vessels, steam generators, fuel assemblies, and other related equipment is generally accomplished by the use of flat, state of the art feeler gauges. In the very thin sizes these gauges are extremely flexible. Such flexibility creates difficulty when inserting these gauges in small gaps, especially those in hard to reach places or distant locations which must be reached by attaching the gauges to remotely manipulated extension arms. Also, the method of using feeler gauges requires that a series of gauges be inserted into the gap until the most close fitting size is found. Devices using strain gauges for distance measurement which applicants are aware of include the following.

U.S. Pat. No. 4,549,355 entitled "Electronic Dendrometer" discloses the use of elongated jaws to engage a plant stem. A transducer made of flexible material spans between the jaws. A plurality of strain gauges are attached at approximate locations on the transducer and connected to a voltage source and voltmeter to monitor changes in plant stem size.

U.S. Pat. No. 4,649,752 entitled "Shime Gap Probe" discloses a probe for use in determining the thickness of an interface gap between two parts. A wave spring formed in one end of a thin elongate piece of resilient steel includes three sinusoidal waves having a peak-to-peak separation that is greater than the maximum thickness of the gaps to be measured. Strain sensors are mounted on the wave spring at the bottom of the concave depression formed by each of the sinusoids and positioned to sense the radial and circumferential strain applied to the wave spring when positioned in a gap such that the wave spring sinusoids are compressed. Two or four strain sensors may be used to create a half or full strain gauge bridge at the bottom of each concave depression. Because three strain bridges are used, information is produced that provides the two-dimensional taper as well as single dimension thickness information necessary for producing the properly sized shim to fill the gap. The shortcomings of this device are that it appears to be limited to use in relatively small gaps, it is necessary to be able to view the markings on the device to insure the device is inserted the proper distance, and it also appears that the device must be compressed before being inserted since the sinusoidal waves have a peak-to-peak separation greater than the thickness of the gap to be measured.

U.S. Pat. No. 4,622,751 entitled "Precision Electromechanical Measuring Device" discloses the use of a strain gauge or pressure transducer to sense changes of position in a workpiece contacting finger. The finger is pivotable about a relatively stiff pivot to different positions, enabling use as a center finder for circular bores and pins.

The known art does not provide for an electronic feeler gauge capable of measuring small and large gaps, that does not need to be compressed before insertion into the gap, and that provides a means for consistently insuring correct insertion depth in the gap being measured during minimum visibility conditions or remote handling operations.

SUMMARY OF THE INVENTION

The present invention solves the above problem in a straightforward manner. What is provided is a flexible base cut into a shape resembling that of a shoehorn. A strain gauge is mounted on the flexible base in a position such that changes in the curvature of the tip of the flexible base as it is inserted into a gap results in strain which can be measured using a strain meter connected to the strain gauge. Previous measurements of known gap sizes allow translation of the meter readings to inches or millimeters to indicate gap size.

BRIEF DESCRIPTION OF THE DRAWINGS

For a better understanding of the nature and objects of the invention, reference should be had to the following detailed description, taken in conjunction with the accompanying drawings in which like parts are given like reference numerals and, wherein.

DETAILED DESCRIPTION OF THE PREFERRED EMBODIMENT

Figure 1:
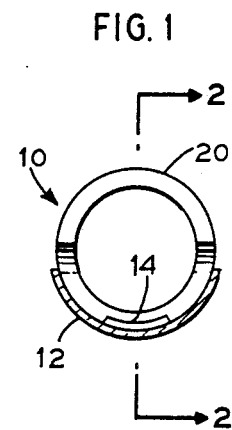
FIG. 1 is a front view of the invention.

Referring to the drawings, it is seen that the invention is generally referred to by the numeral 10. Electronic feeler gauge 10 is generally comprised of flexible base 12, strain gauge 14, and conducting means 16.

Figure 2:
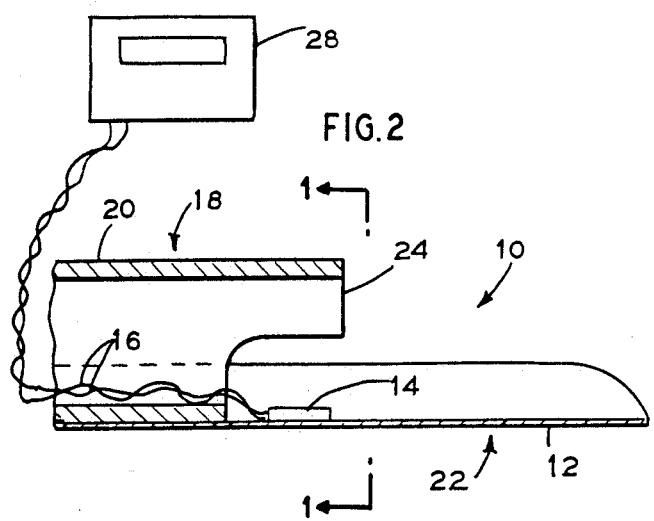
FIG. 2 is a view of the invention taken along the lines 2—2 of FIG. 1.

As best seen in FIGS. 1 and 2, flexible base 12 is formed from a thin elongate piece of flexible material having a generally shoehorn, concave, or open-u shape across its width and over its entire length. Its forward end, the end inserted into gap 26 to be measured, is tapered downwardly toward the forward edge to form a wedge shape for ease of insertion into gap 26. Approximately the rear half 18 of flexible base 12 is provided with shoulder portion 20 which begins at the rear end and extends higher than forward half 22. Raised shoulder portion 20 may be attached to or integral with main body portion 12 and extends upwardly therefrom. Shoulder portion 20 is also provided with tab 24 which extends forward over a portion of forward half 22 and serves as a means for stopping insertion of flexible base 12 into the gap being measured once the proper depth has been reached. Since shoulder portion 20 and tab 24 do not enter the gap being measured and are not required to be as flexible as flexible base 12 they may be formed from thicker material to provide greater durability. In the preferred embodiment, flexible base 12 is formed from 0.002 inch stainless steel shim stock but could also be any thickness from 0.001 inch and higher.

Figure 3:
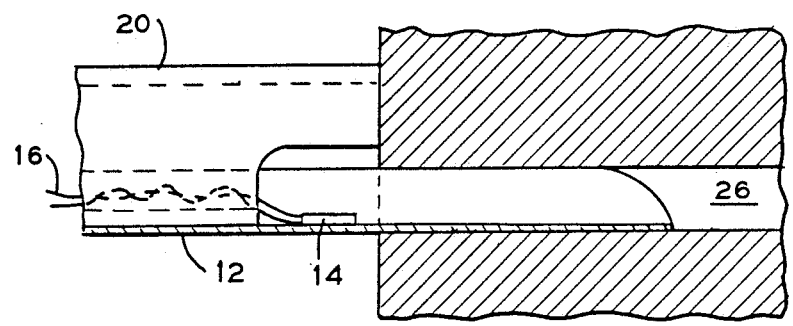
FIG. 3 is a view similar to FIG. 2 showing the invention inserted in a gap to be measured.

As best seen in FIG. 2 and 3, strain gauge 14 is attached to flexible base 12 substantially in alignment with the forward edge of tab 24 and at the bottom portion of the concave curve of flexible base 12. It is only necessary for the purposes of the invention that strain be measured across the width of flexible base 12 as it is inserted into gap 26 indicated in FIG. 3. This allows use of a single direction strain gauge.

Conducting means 16 is comprised of electrical wire connected to strain gauge 14 and connects strain gauge 14 to strain meter 28 which receives electrical signals from strain gauge 14. These signals correspond to the flattening stress placed on strain gauge 14 from insertion of electronic feeler gauge 10 into gap 26. The electrical signals transmitted through strain gauge 14 are directly proportional to the stress thereon. Strain meter 28 is calibrated with strain gauge 14 and translates the signals to a meter reading which directly indicates the relative strain. Calibration tests using gaps of known size allow these readings to be directly read as or converted to gap size in inches or millimeters.

In operation, forward half 22 of electronic feeler gauger 10 is inserted into gap 26 to be measured. The partial flattening of flexible base 12 causes corresponding flattening of strain gauge 14. The electrical signals passing through strain gauge 14 travel through conducting means 14 connected thereto to strain meter 28 which provides a direct readout indicating gap size by correlation of strain produced on strain gauge 14 in known gap sizes. In the preferred embodiment strain meter 28 is a digital strain meter to provide more accurate measurements. The size of the gap capable of being measured by the invention is limited only by material available which is suitable for use as a probe and the limits of strain gauge technology available to measure small strain indications. Although gaps as small as 0.0015 inch have been measured with the invention, large gaps can also be measured simply by increasing the radius of curvature of flexible base 12. The wedge shape of flexible base 12 allows insertion into gaps from remote distances without the necessity of prior compression since the wedge point need only be aligned with the gap and then pushed into the gap until tab 24, a positive stop, contracts the material surrounding the gap.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. An electronic feeler gauge, comprising:
  a. a flexible base in a generally concave shape across it width and having forward and rear ends and a raised shoulder portion extending upwardly from said flexible base and substantially along its rear half;
  b. a strain gauge mounted on said flexible base;
  c. conducting means connected to said strain gauge for connecting said strain gauge to a strain meter which receives electrical signals from said strain gauge.
2. The gauge of claim 1, further comprising a tab extending forward from said shoulder portion.
3. The gauge of claim 1, wherein said strain gauge is positioned at the bottom portion of the concave curve of said flexible base.
4. The gauge of claim 1, wherein said strain gauge only measures strain across the width of said flexible base.
5. An electronic feeler gauge, comprising:
  a. a flexible base in a generally concave shape across its width and having forward and rear ends and a raised shoulder portion extending upwardly from said flexible base and substantially along its rear half;
  b. a tab extending from said shoulder portion toward the forward end of said flexible base;
  c. a strain gauge mounted on said flexible base substantially in alignment with the forward edge of said tab; and
  d. conducting means connected to said strain gauge for connecting said strain gauge to a strain meter which receives electrical signals from said strain gauge.
6. The gauge of claim 5, wherein said strain gauge is positioned at the bottom portion of the concave curve of said flexible base.
7. The gauge of claim 5, wherein said strain gauge only measures strain across the width of said flexible base.
8. The gauge of claim 5, wherein said shoulder portion has a greater thickness than said flexible base.
9. An electronic feeler gauge, comprising:
  a. a flexible base in a generally concave shape across its width an d having forward and rear ends and a raised shoulder portion extending upwardly from said flexible base and substantially along its rear half;
  b. a tab extending from said shoulder portion toward the forward end of said flexible base;
  c. a strain gauge mounted on said flexible base substantially in alignment with the forward edge of said tab which only measures strain across the width of said flexible base; and
  d. conducting means connected to said strain gauge for connecting said strain gauge to a strain meter which receives electrical signals from said strain gauge.

* * * * *